(12) United States Patent
Ogiwara et al.

(10) Patent No.: US 10,641,433 B2
(45) Date of Patent: May 5, 2020

(54) HIGH PRESSURE TANK APPARATUS AND METHOD OF LEAKAGE JUDGMENT OF SAME

(71) Applicant: HONDA MOTOR CO., LTD., Minato-Ku, Tokyo (JP)

(72) Inventors: Naoki Ogiwara, Wako (JP); Takatsugu Koyama, Wako (JP); Toshihiko Kanezaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/294,191

(22) Filed: Mar. 6, 2019

(65) Prior Publication Data
US 2019/0277453 A1    Sep. 12, 2019

(30) Foreign Application Priority Data
Mar. 7, 2018 (JP) .................. 2018-040388

(51) Int. Cl.
*F17D 5/02* (2006.01)
*F17C 13/02* (2006.01)
(Continued)

(52) U.S. Cl.
CPC ...... *F17C 13/025* (2013.01); *B60K 15/03006* (2013.01); *F17C 7/02* (2013.01);
(Continued)

(58) Field of Classification Search
CPC . B60K 2015/0321; B60K 2015/03315; H01M 8/04089; F17C 13/025; Y10T 137/0452; Y10T 137/5762
See application file for complete search history.

(56) References Cited

U.S. PATENT DOCUMENTS 5,132,663 A * 7/1992 Strobl .................... B60H 1/008
340/438
5,701,928 A * 12/1997 Aoki ................ B60K 15/03006
123/516
(Continued)

FOREIGN PATENT DOCUMENTS

JP    H10-030798 A    2/1998
JP    H11-210988 A    8/1999
(Continued)

*Primary Examiner* — Robert K Arundale
(74) *Attorney, Agent, or Firm* — Carrier Blackman & Associates, P.C.; Joseph P. Carrier; William D. Blackman (57) ABSTRACT

A high pressure tank of a high pressure tank apparatus includes: a resin-made liner; a reinforced layer covering an outer surface of the liner; and a supplying/discharging hole to which a supplying/discharging flow path is connected via a connecting section. A storage section is capable of storing a leaked fluid that has leaked from the connecting section and a temporary release fluid that has been led out from between the liner and the reinforced layer. A control section, when an internal pressure detection value of the high pressure tank due to a pressure sensor is greater than a threshold value, judges whether the leaked fluid has occurred, based on a detection result of a sensor detecting a concentration of a hydrogen gas inside the storage section, and otherwise does based on a detection result of the pressure sensor.

7 Claims, 5 Drawing Sheets

(51) Int. Cl.
*F17C 7/02* (2006.01)
*B60K 15/03* (2006.01)

(52) U.S. Cl.
CPC ............... *B60K 2015/0321* (2013.01); *B60K 2015/03315* (2013.01); *F17C 2205/0305* (2013.01); *F17C 2221/012* (2013.01); *F17C 2250/03* (2013.01); *F17C 2260/038* (2013.01); *F17C 2270/0184* (2013.01); *Y10T 137/0452* (2015.04)

(56) References Cited

U.S. PATENT DOCUMENTS

| | | | | |
|---|---|---|---|---|
| 6,782,914 | B2* | 8/2004 | Kami | ............... B60K 15/03006 123/516 |
| 2012/0318368 | A1* | 12/2012 | Doughty | ............. G01M 3/2815 137/12 |
| 2013/0202988 | A1* | 8/2013 | Wang | ................ H01M 8/04201 429/513 |

FOREIGN PATENT DOCUMENTS

| | | | |
|---|---|---|---|
| JP | 2002-211253 | A | 7/2002 |
| JP | 2006-177483 | A | 7/2006 |
| JP | 2009-243675 | A | 10/2009 |

* cited by examiner

HIGH PRESSURE TANK APPARATUS AND METHOD OF LEAKAGE JUDGMENT OF SAME

CROSS-REFERENCE TO RELATED APPLICATION

This application is based upon and claims the benefit of priority from Japanese Patent Application No. 2018-040388 filed on Mar. 7, 2018, the contents of which are incorporated herein by reference.

BACKGROUND OF THE INVENTION

Field of the Invention

The present invention relates to a high pressure tank apparatus that includes a high pressure tank and in which a fluid is supplied/discharged to/from a resin-made liner of the high pressure tank via a discharging/supplying flow path, and to a method of leakage judgment of the high pressure tank apparatus.

Description of the Related Art

There is known a high pressure tank that includes: a resin-made liner capable of storing a fluid on its inside; a reinforced layer configured from the likes of a fiber-reinforced plastic, that covers an outer surface of the liner; a cap that is provided in an opening of the liner and the reinforced layer, and has formed therein an insertion hole that communicates the inside and an outside of the liner; and an inserting member that is inserted in the insertion hole. The inserting member has formed therein a supplying/discharging hole penetrating the inserting member, and a supplying/discharging flow path for supplying/discharging the fluid to/from the inside of the liner is connected to the supplying/discharging hole via a connecting section. Moreover, the inserting member has incorporated therein a main stop valve by which communication or blocking of between the inside of the liner and the supplying/discharging flow path via the supplying/discharging hole, can be switched.

In a high pressure tank apparatus including this kind of high pressure tank, when leakage of the fluid has occurred from the high pressure tank, and so on, during an abnormality of the high pressure tank apparatus, a countermeasure such as closing the above-described main stop valve to stop supplying/discharging of the fluid, is taken. Therefore, the high pressure tank apparatus generally includes a configuration for judging whether or not leakage during an abnormality has occurred. As an example of such a configuration, there may be cited: a storage section that surrounds the high pressure tank, and so on, in order to enable the fluid that has leaked during an abnormality to be stored; a detection sensor that detects the fluid inside the storage section; and a control section that, when the fluid has been detected by the detection sensor, judges whether leakage has occurred.

Incidentally, as described in Japanese Laid-Open Patent Publication No. 2009-243675, for example, in a high pressure tank including a resin-made liner, the fluid sometimes permeates the liner to enter between the outer surface of the liner and the reinforced layer (hereafter, also called a covered section), and so on. There is concern that if the fluid accumulates in the covered section, there will more easily occur the likes of separation of the liner and the reinforced layer, or buckling where the liner projects toward its inside. Therefore, the fluid that has permeated the liner to enter the covered section is preferably led out to outside of the covered section.

The fluid led out from the covered section (hereafter, also called a temporary release fluid) occurs in a temporarily limited amount, hence is discharged to outside of the high pressure tank as part of normal operation of the high pressure tank apparatus. In other words, the temporary release fluid differs from the leaked fluid that leaks during an abnormality of the high pressure tank apparatus.

SUMMARY OF THE INVENTION

In the high pressure tank apparatus provided with the likes of the storage section or detection sensor as described above, the temporary release fluid and the leaked fluid are similarly stored in the storage section, hence there is concern that when the temporary release fluid that has been led out during normal operation has been detected by the detection sensor, it will end up being mistakenly judged that the leaked fluid leaking during an abnormality has occurred.

A main object of the present invention is to provide a high pressure tank apparatus in which it can be avoided being mistakenly judged during normal operation that leakage during an abnormality has occurred, and in which it can be judged with high accuracy that leakage during an abnormality has occurred.

Another object of the present invention is to provide a method of leakage judgment of the above-described high pressure tank apparatus.

According to one embodiment of the present invention, there is provided a high pressure tank apparatus that includes a high pressure tank and in which a fluid is supplied/discharged to/from a resin-made liner of the high pressure tank via a supplying/discharging flow path, the high pressure tank including: a reinforced layer covering an outer surface of the liner; and a supplying/discharging hole that communicates the supplying/discharging flow path and an inside of the liner, the high pressure tank apparatus including: a storage section capable of storing a leaked fluid and a temporary release fluid, the leaked fluid being the fluid that has leaked from at least a connecting section of the supplying/discharging flow path and the supplying/discharging hole, and the temporary release fluid being the fluid that has been led out to outside of the high pressure tank from between the liner and the reinforced layer; a concentration sensor that detects a concentration of the fluid inside the storage section; a pressure sensor that detects an internal pressure of the high pressure tank; and a control section that judges whether or not the leaked fluid has occurred, the control section, in the case where an internal pressure detection value of the high pressure tank obtained by the pressure sensor is greater than a sensor selection threshold value, judging whether or not the leaked fluid has occurred, based on a detection result of the concentration sensor, and in the case where the internal pressure detection value is less than or equal to the sensor selection threshold value, judging whether or not the leaked fluid has occurred, based on a detection result of the pressure sensor.

The connecting section of the supplying/discharging flow path and the supplying/discharging hole is a place set so as to prevent leakage of the fluid occurring during normal operation of the high pressure tank apparatus. Therefore, the leaked fluid being the fluid that has leaked from at least the connecting section is a fluid that has leaked due to an abnormality occurring in the high pressure tank apparatus. On the other hand, the temporary release fluid is a fluid that, during normal operation of the high pressure tank apparatus, has permeated the liner to enter between the outer surface of the liner and the reinforced layer (hereafter, also called a covered section), and has then been led out to outside of the high pressure tank from the covered section.

When the internal pressure of the high pressure tank increases, a pressing force with which the liner is pressed toward the reinforced layer also increases, so it becomes more difficult for the fluid to enter the covered section. As a result, it becomes more difficult for the temporary release fluid to occur. Contrarily, when the internal pressure of the high pressure tank decreases, the pressing force with which the liner is pressed toward the reinforced layer also decreases, so it becomes easier for the fluid to enter the covered section. As a result, it becomes easier for the temporary release fluid to occur.

In this high pressure tank apparatus, for example, a maximum value of the internal pressure of the high pressure tank at which the temporary release fluid occurs is set as the sensor selection threshold value. In other words, when the internal pressure of the high pressure tank is less than or equal to the sensor selection threshold value, the temporary release fluid is led out from the covered section to be stored in the storage section. Therefore, the control section, in the case where the internal pressure detection value of the high pressure tank obtained by the pressure sensor is less than or equal to the sensor selection threshold value, judges whether or not the leaked fluid has occurred, based on the detection result of the pressure sensor, not the concentration sensor that detects the concentration of the fluid inside the storage section. As a result, it can be avoided being mistakenly judged during normal operation of the high pressure tank apparatus that leakage during an abnormality has occurred.

On the other hand, when the internal pressure of the high pressure tank becomes greater than the sensor selection threshold value, it becomes easier for a leakage speed and leakage amount of the leaked fluid to increase, proportionally to a pressure difference of the inside and outside of the liner increasing. Therefore, in the case where the internal pressure of the high pressure tank is greater than the sensor selection threshold value, it is required to be judged with high accuracy that the leaked fluid has occurred. Accordingly, the control section, in the case where the internal pressure detection value of the high pressure tank is greater than the sensor selection threshold value, judges whether or not the leaked fluid has occurred, based on the detection result of the concentration sensor. As a result, it becomes possible for the above-described judgment to be performed with higher accuracy compared to when based on the detection result of the pressure sensor.

At this time, as described above, the internal pressure detection value of the high pressure tank is greater than the sensor selection threshold value, hence the temporary release fluid is not stored in the storing section. Therefore, even if the above-described judgment is performed based on the detection result of the concentration sensor in order to highly accurately obtain a judgment result, it can be avoided that the temporary release fluid is detected by the concentration sensor, hence it can be avoided being mistakenly judged during normal operation that leakage during an abnormality has occurred.

In the above-described high pressure tank apparatus, it is preferable that in the case where the internal pressure detection value is greater than the sensor selection threshold value, the control section judges that the leaked fluid has occurred when a concentration detection value inside the storage section obtained by the concentration sensor is greater than a certain value. Note that the certain value is a concentration of the fluid inside the storage section representing a judgment standard of whether or not the leaked fluid has occurred, and is preset according to specifications of the high pressure tank apparatus, and so on.

As described above, in the case where the internal pressure detection value of the high pressure tank is greater than the sensor selection threshold value, the temporary release fluid is not stored in the storage section, so the concentration of the leaked fluid can be obtained by the concentration sensor as the concentration detection value. Therefore, by comparing the concentration detection value and the certain value, it can be avoided being mistakenly judged during normal operation that leakage during an abnormality has occurred, and it can be judged with high accuracy that the leaked fluid has occurred.

In the above-described high pressure tank apparatus, it is preferable that in the case where the internal pressure detection value is less than or equal to the sensor selection threshold value, the control section judges that the leaked fluid has occurred when a decrease amount per unit time of the internal pressure detection value is greater than or equal to a judgment threshold value. Note that the judgment threshold value is a decrease amount per unit time of the internal pressure detection value representing a judgment standard of whether or not the leaked fluid has occurred, and is preset according to a load at a supplying destination of the fluid (a consumption speed of the fluid) or according to specifications of the high pressure tank apparatus, and so on, for example.

Since the decrease amount per unit time of the internal pressure of the high pressure tank increases more when the leaked fluid has occurred than during normal operation, then by comparing the decrease amount per unit time of the internal pressure detection value of the high pressure tank and the judgment threshold value, it can be avoided being mistakenly judged during normal operation that leakage during an abnormality has occurred, and it can be easily judged that the leaked fluid has occurred.

In the above-described high pressure tank apparatus, it is preferable that the high pressure tank includes a cap provided in an opening of the reinforced layer, and that the cap has formed therein a lead-out hole by which the fluid interposing between the liner and the reinforced layer is led out to inside the storage section. In this case, it becomes possible for the temporary release fluid to be favorably led to the storage section by the lead-out hole, and for accumulation of the fluid in the covered section to be effectively suppressed. Therefore, it can be more effectively avoided that the temporary leaked fluid is discharged to a place other than the storage section. Moreover, it can be more effectively avoided there occurring the likes of separation of the liner and the reinforced layer, or buckling where the liner projects toward its inside, and there can thus be achieved further improvement in durability of the high pressure tank.

According to another embodiment of the present invention, there is provided a method of leakage judgment of a high pressure tank apparatus that includes a high pressure tank and in which a fluid is supplied/discharged to/from a resin-made liner of the high pressure tank via a supplying/discharging flow path, the high pressure tank including: a reinforced layer covering an outer surface of the liner; and a supplying/discharging hole that communicates the supplying/discharging flow path and an inside of the liner, and the high pressure tank apparatus including: a storage section capable of storing a leaked fluid and a temporary release fluid, the leaked fluid being the fluid that has leaked from at least a connecting section of the supplying/discharging flow path and the supplying/discharging hole, and the temporary release fluid being the fluid that has been led out to outside of the high pressure tank from between the liner and the reinforced layer; a concentration sensor that detects a concentration of the fluid inside the storage section; a pressure sensor that detects an internal pressure of the high pressure tank; and a control section that judges whether or not the leaked fluid has occurred, the method of leakage judgment including: a comparing step where an internal pressure detection value due to the pressure sensor and a sensor selection threshold value are compared; and a judging step where in the case where the internal pressure detection value is greater than the sensor selection threshold value, it is judged whether or not the leaked fluid has occurred, based on a detection result of the concentration sensor, and in the case where the internal pressure detection value is less than or equal to the sensor selection threshold value, it is judged whether or not the leaked fluid has occurred, based on a detection result of the pressure sensor.

In this method of leakage judgment, the comparing step compares the sensor selection threshold value that has been set as the internal pressure of the high pressure tank at which the temporary release fluid begins to occur, and the internal pressure detection value of the high pressure tank. As a result, in the case where the internal pressure detection value of the high pressure tank is less than or equal to the sensor selection threshold value, that is, in the case where it has become easier for the temporary release fluid to be led out from the covered section to be stored in the storage section, it is judged in the judging step whether or not the leaked fluid has occurred, based on the detection result of the pressure sensor, not the concentration sensor that detects the concentration of the fluid inside the storage section. As a result, it can be avoided being mistakenly judged during normal operation that leakage during an abnormality has occurred.

On the other hand, in the case where the internal pressure detection value of the high pressure tank is greater than the sensor selection threshold value, that is, in the case where it is required to be judged with high accuracy that the leaked fluid has occurred, it is judged in the judging step whether or not the leaked fluid has occurred, based on the detection result of the concentration sensor. As a result, the above-described judgment can be performed with higher accuracy than when based on the detection result of the pressure sensor. At this time, the temporary release fluid is not stored in the storage section, so even if the above-described judgment is performed based on the detection result of the concentration sensor, it can be avoided being mistakenly judged during normal operation that leakage during an abnormality has occurred.

In the above-described method of leakage judgment, it is preferable that in the case where the internal pressure detection value is greater than the sensor selection threshold value, it is judged in the judging step that the leaked fluid has occurred when a concentration detection value due to the concentration sensor is greater than a certain value. In this case, the concentration detection value can be obtained as the concentration of the leaked fluid by the concentration sensor, so by comparing the concentration detection value and the certain value, it can be avoided being mistakenly judged during normal operation that leakage during an abnormality has occurred, and it can be judged with high accuracy that the leaked fluid has occurred.

In the above-described method of leakage judgment, it is preferable that in the case where the internal pressure detection value is less than or equal to the sensor selection threshold value, it is judged in the judging step that the leaked fluid has occurred when a decrease amount per unit time of the internal pressure detection value due to the pressure sensor is greater than or equal to a judgment threshold value. By thus comparing the decrease amount per unit time of the internal pressure detection value of the high pressure tank and the judgment threshold value, it can be avoided being mistakenly judged during normal operation that leakage during an abnormality has occurred, and it can be easily judged that the leaked fluid has occurred.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a high pressure tank apparatus and a method of leakage judgment of the same according to the present invention will be presented and described in detail with reference to the accompanying drawings. Note that in the drawings below, configuring elements displaying the same or similar functions and advantages will be assigned with the same reference symbols, and repeated descriptions thereof will sometimes be omitted.

Figure 1:
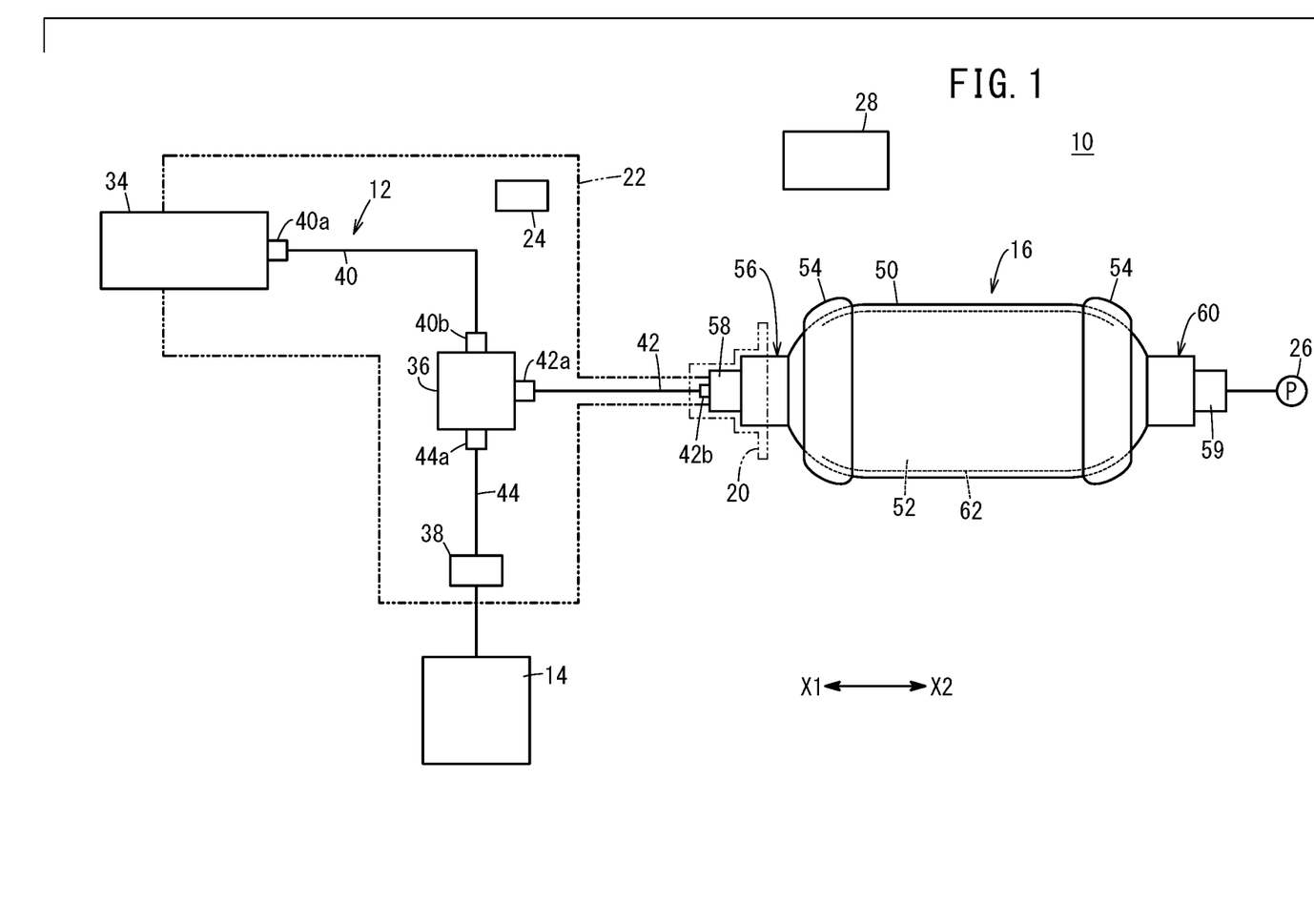
FIG. 1 is a schematic configuration diagram of a high pressure tank apparatus and a supplying/discharging flow path according to an embodiment of the present invention.

As shown in FIG. 1, a high pressure tank apparatus 10 according to the present embodiment can be preferably employed as a high pressure tank apparatus that is mounted in a mounting body (not illustrated) being a fuel cell vehicle such as a fuel cell electric automobile, for example, and that includes a high pressure tank 16 storing a hydrogen gas supplied to a fuel cell system 14 via a supplying/discharging flow path 12. Accordingly, although the present embodiment describes an example where the mounting body is assumed to be a fuel cell vehicle and the high pressure tank 16 stores hydrogen gas as a fluid, the present embodiment is not particularly limited to this. The high pressure tank apparatus 10 may be mounted in a mounting body other than a fuel cell vehicle, and it is also possible for a fluid other than hydrogen gas to be stored in the high pressure tank 16.

The high pressure tank apparatus 10 mainly includes: the high pressure tank 16 that is supplied with/discharges a hydrogen gas via the supplying/discharging flow path 12; a cover member 20; a storage section 22; a concentration sensor 24; a pressure sensor 26; and a control section 28.

The supplying/discharging flow path 12 is for example configured capable of supplying to the high pressure tank 16 via a branch path 36 the hydrogen gas that has been supplied from a filling port 34, and capable of supplying to a regulator 38 via the branch path 36 the hydrogen gas that has been discharged from the high pressure tank 16 and after the hydrogen gas is pressured-adjusted, supplying the hydrogen gas to the fuel cell system 14. In this case, the supplying/discharging flow path 12 is configured by the likes of: a pipe 40 connecting between the filling port 34 and the branch path 36; a pipe 42 connecting the branch path 36 and the high pressure tank 16; and a pipe 44 connecting the branch path 36 and the fuel cell system 14 via the regulator 38.

One end section of the pipe 40 is provided with a connecting section 40a that connects the pipe 40 with the filling port 34, and the other end section of the pipe 40 is provided with a connecting section 40b that connects the pipe 40 with the branch path 36. One end section of the pipe 42 is provided with a connecting section 42a that connects the pipe 42 with the branch path 36, and the other end section of the pipe 42 is provided with a connecting section 42b (a connecting section) that connects the pipe 42 with the high pressure tank 16. One end section of the pipe 44 is provided with a connecting section 44a that connects the pipe 44 with the branch path 36. Each of these connecting sections 40a, 40b, 42a, 42b, 44a is formed in an airtight manner so as to prevent leakage of the hydrogen gas occurring during normal operation of the high pressure tank apparatus 10.

Figure 2:
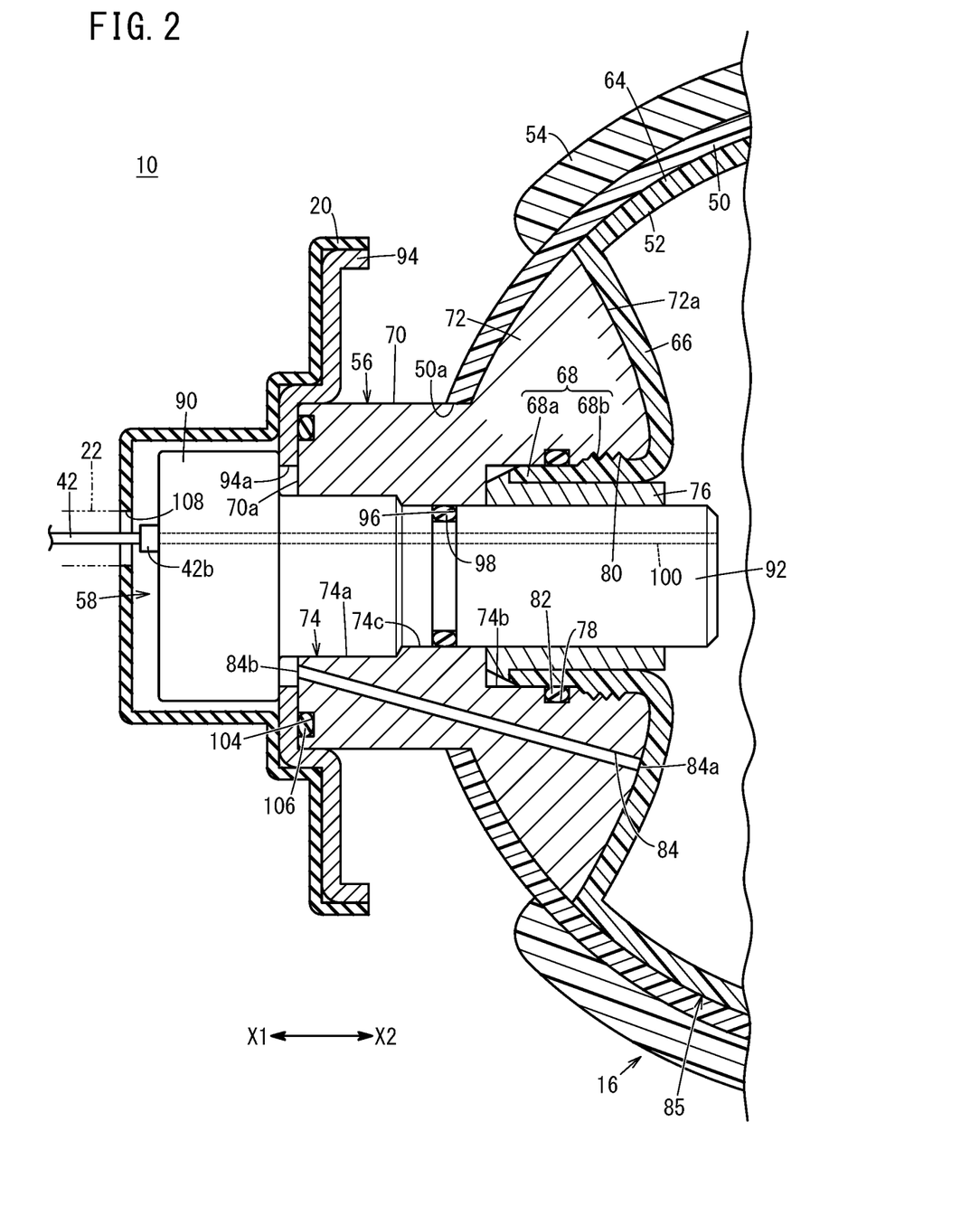
FIG. 2 is an enlarged cross-sectional view of essential parts on a side of one end in an axial direction of the high pressure tank apparatus of FIG. 1.
Figure 3:
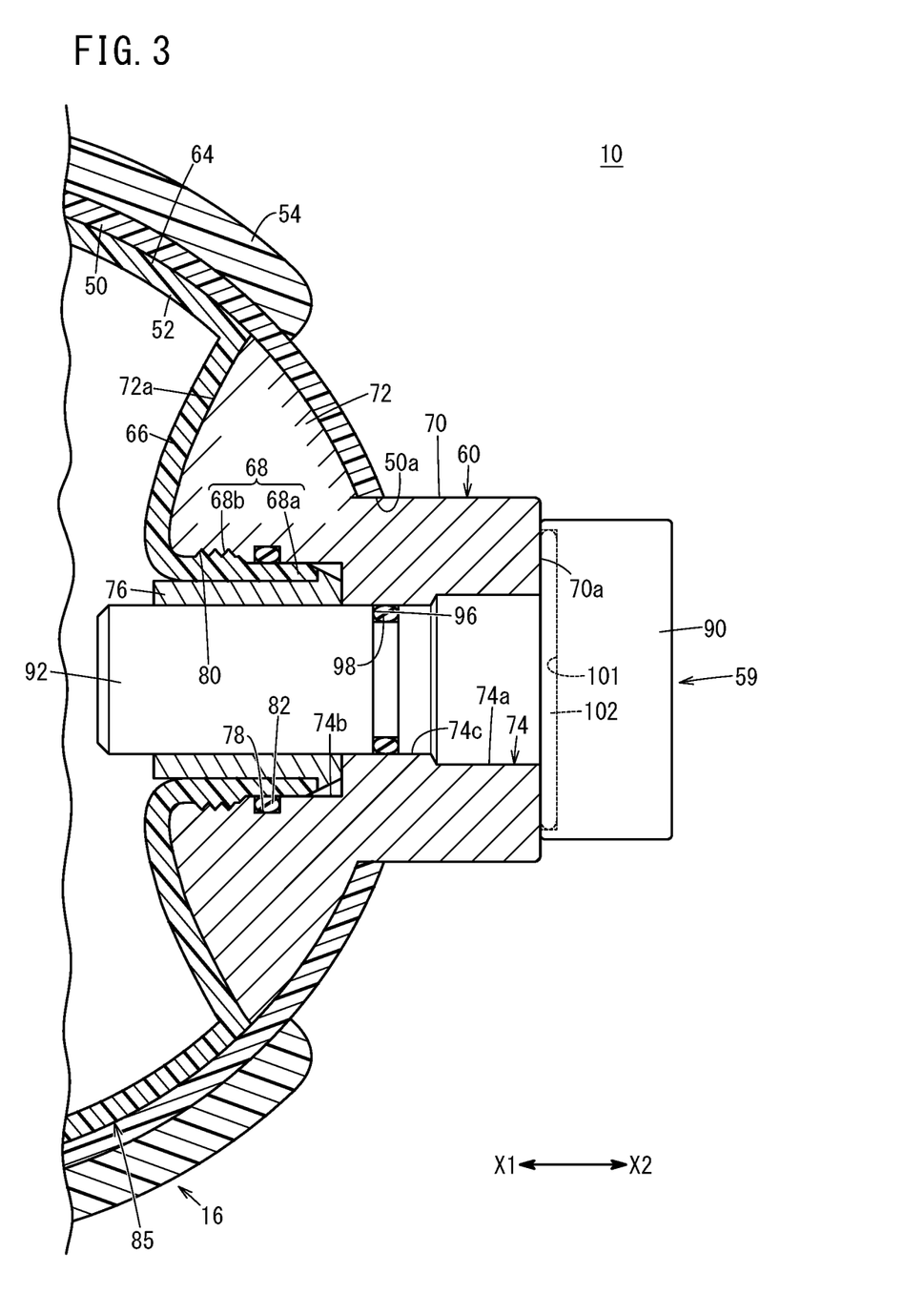
FIG. 3 is an enlarged cross-sectional view of essential parts on a side of the other end in the axial direction of the high pressure tank apparatus of FIG. 1.

As shown in FIGS. 1 to 3, the high pressure tank 16 includes a reinforced layer 50, a liner 52, a protective member 54, a supplying/discharging-side cap 56 (a cap), inserting members 58, 59, and an end-side cap 60. The high pressure tank 16 has the supplying/discharging-side cap 56 provided on one end side (a side of arrow X1 in FIG. 1) in its axial direction (hereafter, the axial direction of the high pressure tank 16 will also simply be called an axial direction), and has the end-side cap 60 provided on its other end side (a side of arrow X2 in FIG. 1) in the axial direction.

The reinforced layer 50 is configured from the likes of a carbon fiber reinforced plastic (CFRP), and covers an outer surface of the liner 52, and so on. The liner 52 is a hollow body configured from a resin, and is capable of storing the hydrogen gas on its inside. Specifically, the liner 52 includes: a cylindrical trunk section 62 (refer to FIG. 1); a dome-like section 64 (refer to FIGS. 2 and 3) provided on both sides in the axial direction of the trunk section 62; a sunken section 66 (refer to FIGS. 2 and 3) provided on both sides in the axial direction of the dome-like section 64; and a cylindrical section 68 (refer to FIGS. 2 and 3) that projects from the sunken section 66 and has a smaller diameter than the trunk section 62. Note that in the present embodiment, the reinforced layer 50 and the liner 52 have their one end side and their other end side in the axial direction configured substantially similarly.

The sunken section 66 sinks toward the inside where the hydrogen gas of the liner 52 is stored. The cylindrical section 68 has a thin section 68a provided on its projecting end side (a side of arrow X1 in FIG. 2), and has a male thread 68b provided more to its base end side (a side of arrow X2 in FIG. 2) than the thin section 68a.

The protective member 54 is configured from the likes of a resin, for example, and covers, via the reinforced layer 50, mainly a boundary portion of the dome-like section 64 and trunk section 62 of the liner 52 and a periphery of the boundary portion. By the protective member 54 being thus provided, impact resistance, and so on, of the high pressure tank 16 can be improved.

As shown in FIG. 2, the supplying/discharging-side cap 56 is made of a metal, for example, and is sheathed by the cylindrical section 68 of the liner 52. Moreover, the supplying/discharging-side cap 56 includes a cylindrical projection 70 and a shoulder section 72 that extends outwardly in a radial direction from a base end of the projection 70, and there is an insertion hole 74 formed penetrating along an axial direction of the projection 70. An end surface 72a on an opposite side to the projection 70 (the side of arrow X2 in FIG. 2), of the shoulder section 72 faces an outer surface of the sunken section 66 of the liner 52. Moreover, an outer peripheral surface of the shoulder section 72, along with the trunk section 62 and dome-like section 64 of the liner 52, are covered by the reinforced layer 50. The projection 70 projects so as to be exposed from an opening 50a provided in the reinforced layer 50.

The insertion hole 74 has diameters that differ depending on regions and includes: a medium inner diameter hole 74a positioned on a tip surface 70a side of the projection 70; a large inner diameter hole 74b positioned on an end surface 72a side of the shoulder section 72; and a small inner diameter hole 74c positioned between these medium inner diameter hole 74a and large inner diameter hole 74b. The cylindrical section 68 of the liner 52 is inserted in the large inner diameter hole 74b, and a cylindrical collar 76 is press-fitted into the cylindrical section 68. As a result, the cylindrical section 68 is supported between an inner circumferential surface of the large inner diameter hole 74b and an outer circumferential surface of the collar 76.

An annular seal groove 78 that follows a circumferential direction is formed in an inner wall of the large inner diameter hole 74b in a region facing the thin section 68a of the cylindrical section 68, and a female thread 80 that is screwed onto the male thread 68b of the cylindrical section 68 is formed in the inner wall of the large inner diameter hole 74b in a region facing the male thread 68b. A seal member 82 configured from an O ring is arranged on an inside of the seal groove 78, whereby a seal is made between the outer circumferential surface of the cylindrical section 68 and the inner circumferential surface of the large inner diameter hole 74b. Moreover, by the male thread 68b and the female thread 80 being screwed to and engaged with each other, the cylindrical section 68 of the liner 52 and the supplying/discharging-side cap 56 are joined.

The supplying/discharging-side cap 56 has further formed therein a lead-out hole 84 penetrating the supplying/discharging-side cap 56. The lead-out hole 84 is provided in order for the hydrogen gas interposing between the liner 52 and the reinforced layer 50 (hereafter, also called a covered section 85) to be led out to outside of the covered section 85. Specifically, one of openings, namely, an opening 84a, of the lead-out hole 84 is provided in the end surface 72a of the supplying/discharging-side cap 56, and the other of the openings, namely, an opening 84b, of the lead-out hole 84 is provided in the tip surface 70a of the projection 70. In other words, the hydrogen gas that has entered the covered section 85 flows into the lead-out hole 84 via the one of the openings, namely, the opening 84a, and is discharged from the lead-out hole 84 via the other of the openings, namely, the opening 84b. Hereafter, the hydrogen gas that has thus been led out to outside of the covered section 85 by the lead-out hole 84 will also be called a temporary release fluid. Note that the supplying/discharging-side cap 56 may be provided with only one lead-out hole 84, or may be provided with a plurality of the lead-out holes 84 at fixed intervals in a circumferential direction of the supplying/discharging-side cap 56.

The inserting member 58 includes: a head section 90 whose outer diameter is larger than a diameter of the medium inner diameter hole 74a; and an inserting section 92 that extends from the head section 90 toward an inside of the insertion hole 74. In the inserting member 58, the inserting section 92 is inserted in the insertion hole 74 along circumferential surfaces of the medium inner diameter hole 74a and small inner diameter hole 74c and an inner circumferential surface of the collar 76. At this time, a supporting plate 94 for attaching the cover member 20 to the high pressure tank 16 is sandwiched between the head section 90 of the inserting member 58 exposed from the insertion hole 74 and the tip surface 70a of the projection 70, as will be mentioned later.

An outer circumferential surface of a portion facing the small inner diameter hole 74c in the insertion hole 74, of the inserting section 92 has formed therein an annular seal groove 96 that follows the circumferential direction, and there is arranged on an inside of the seal groove 96 a seal member 98 configured from an O ring. As a result, a seal is made between an outer circumferential surface of the inserting section 92 and an inner circumferential surface of the insertion hole 74.

Moreover, a supplying/discharging hole 100 is formed on an inside of the inserting member 58 penetrating the inserting member 58. The pipe 42 of the supplying/discharging flow path 12 is connected to the supplying/discharging hole 100 via the connecting section 42b. As a result, the supplying/discharging hole 100 communicates the supplying/discharging flow path 12 and the inside of the liner 52. Moreover, an unillustrated main stop valve (an electromagnetic valve) is incorporated in the inside of the inserting member 58, and a configuration is adopted enabling a communicated state and a blocked state of the supplying/discharging flow path 12 and the inside of the liner 52 to be switched by opening/closing the main stop valve.

As shown in FIG. 3, the end-side cap 60 is configured similarly to the supplying/discharging-side cap 56, apart from not being provided with the lead-out hole 84 and the seal groove 104 (refer to FIG. 2). In other words, the end-side cap 60 is sheathed by the cylindrical section 68 of the liner 52 via the insertion hole 74.

The inserting member 59 is inserted in the insertion hole 74 of the end-side cap 60. The inserting member 59 is configured similarly to the inserting member 58, apart from not having formed therein the supplying/discharging hole 100 and not having incorporated therein the above-described main stop valve, and apart from being provided with a seal groove 101. The seal groove 101 is formed in a surface facing the tip surface 70a of the projection 70, of the head section 90, and a seal member 102 configured from an O ring is arranged on an inside of the seal member 102. As a result, a seal is made between the head section 90 of the inserting member 59 and the tip surface 70a of the projection 70.

As shown in FIG. 2, the supporting plate 94, by being sandwiched between the head section 90 of the inserting member 58 and the projection 70 of the supplying/discharging-side cap 56 as described above, is attached to the high pressure tank 16, so as to cover a tip side of the projection 70. Specifically, the supporting plate 94 has formed in substantially its center a plate through-hole 94a of larger diameter than an outer diameter of the inserting section 92 and of smaller diameter than the outer diameter of the head section 90. That is, the inserting section 92 is inserted in the coaxially overlapped plate through-hole 94a and insertion hole 74.

An annular seal groove 104 is formed in a place facing the supporting plate 94 more to an outer side in the radial direction of the projection 70 than the opening 84b on a side discharging the temporary release fluid of the lead-out hole 84 is, of the tip surface 70a of the projection 70. A seal member 106 configured from an O ring is arranged on an inside of this seal groove 104, whereby a seal is made between the projection 70 and the supporting plate 94.

The cover member 20 is configured from the likes of rubber or stainless steel (SUS), for example, and is attached to the supporting plate 94 so as to cover the head section 90 of the inserting member 58 and the opening 84b of the lead-out hole 84. Moreover, a portion facing the connecting section 42b of the cover member 20 has formed therein a cover through-hole 108 in which the pipe 42 extending from the connecting 42b is inserted.

As shown in FIGS. 1 and 2, the storage section 22 is configured by a wall section that at least surrounds the supplying/discharging flow path 12 including the connecting sections 40a, 40b, 42a, 42b, 44a, for example. As a result, the storage section 22 is configured capable of storing the leaked fluid that has leaked, due to an abnormality occurring in the high pressure tank apparatus 10, from a place such as the connecting section 42b that has been designed not to leak the hydrogen gas during normal operation of the high pressure tank apparatus 10.

Moreover, an inside of the storage section 22 communicates with an inside of the cover member 20 via the cover through-hole 108. As a result, the storage section 22 is configured capable of storing via the inside of the cover member 20 the temporary release fluid that has been led out from the covered section 85 by the lead-out hole 84.

The concentration sensor 24 (refer to FIG. 1) is arranged inside the storage section 22, and detects a concentration of the hydrogen gas inside the storage section 22. It is possible to employ as the concentration sensor 24 a variety of hydrogen sensors capable of detecting the concentration of the hydrogen gas.

The pressure sensor 26 is attached to the high pressure tank 16 so as to enable an internal pressure of the high pressure tank 16 to be detected. In the present embodiment, the pressure sensor 26 is configured capable of detecting the internal pressure of the high pressure tank 16 via the likes of an unillustrated communicating hole formed in the end-side cap 60 so as to communicate with the inside of the liner 52. Note that illustration of the pressure sensor 26 is omitted in FIG. 3.

The control section 28 is configured as a computer including the likes of an unillustrated CPU or unillustrated memory. The control section 28, in the case where an internal pressure detection value of the high pressure tank 16 obtained by the pressure sensor 26 is greater than a sensor selection threshold value, judges whether or not the leaked fluid has occurred, based on a detection result of the concentration sensor 24. On the other hand, the control section 28, in the case where the internal pressure detection value of the high pressure tank 16 is less than or equal to the sensor selection threshold value, judges whether or not the leaked fluid has occurred, based on a detection result of the pressure sensor 26.

The sensor selection threshold value is a maximum value of the internal pressure of the high pressure tank 16 at which the temporary release fluid occurs, and may be set to the likes of substantially ½ of a maximum filling pressure of the high pressure tank 16, for example. When the internal pressure of the high pressure tank 16 is greater than the sensor selection threshold value, a pressing force with which the liner 52 is pressed toward the reinforced layer 50 increases, and it gets more difficult for the fluid to enter the covered section 85, so the temporary release fluid ceases to occur. On the other hand, when the internal pressure of the high pressure tank 16 is less than or equal to the sensor selection threshold value, the pressing force with which the liner 52 is pressed toward the reinforced layer 50 decreases, and it gets easier for the fluid to enter the covered section 85, so the temporary release fluid is enabled to occur.

The high pressure tank apparatus 10 according to the present embodiment is basically configured as above. In operation at a normal time of the high pressure tank apparatus 10, when the hydrogen gas is filled into the liner 52 of the high pressure tank 16, for example, the hydrogen gas is supplied from a hydrogen replenishment source (not illustrated) to the supplying/discharging flow path 12 via the filling port 34. The hydrogen gas that has been supplied to the supplying/discharging flow path 12 is supplied to the inside of the liner 52 via the pipe 40, the branch path 36, the pipe 42, the supplying/discharging hole 100, and the main stop valve in the opened state. When the liner 52 has been sufficiently filled with the hydrogen gas by this supplying, supplying of the hydrogen gas from the hydrogen replenishment source is stopped.

When the hydrogen gas inside the liner 52 is supplied to the fuel cell system 14, the hydrogen gas that has been discharged to the pipe 42 from inside the liner 52 via the supplying/discharging hole 100 and the main stop valve in the opened state, is sent to the regulator 38. This hydrogen gas has its pressure adjusted by the regulator 38, and is then supplied to the fuel cell system 14 via the pipe 44. As a result, an electrochemical reaction (an electricity generating reaction) occurs due to the hydrogen gas, and so on, being consumed in the fuel cell system 14, and electric power is obtained. A configuration is adopted enabling this electric power to be utilized to run the mounting body.

Figure 4:
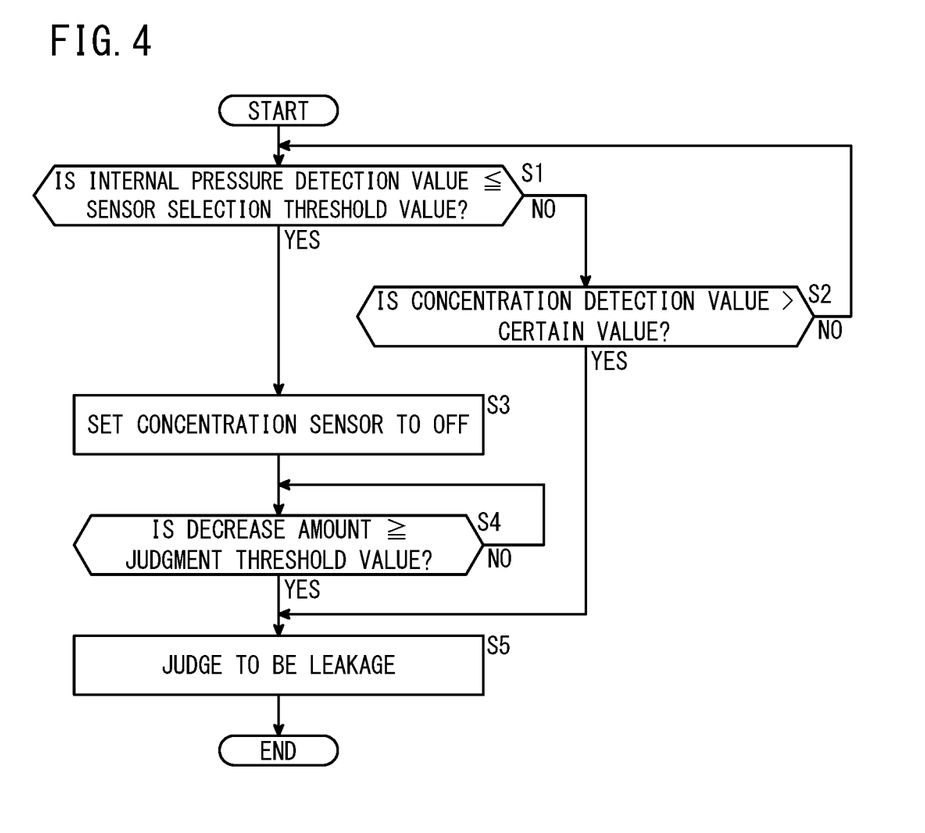
FIG. 4 is a flowchart explaining one example of a method of leakage judgment of the high pressure tank apparatus of FIG. 1.

Next, a method of leakage judgment of the high pressure tank apparatus 10 according to the present embodiment will be described with reference to FIG. 4. In this method of leakage judgment, first, a comparing step is performed. In the comparing step, the internal pressure detection value of the high pressure tank 16 due to the pressure sensor 26 and the sensor selection threshold value are compared, and it is detected whether or not the internal pressure detection value is less than or equal to the sensor selection threshold value (step S1).

Next, a judging step is performed. In the judging step, if it is detected in step S1 that the internal pressure detection value of the high pressure tank 16 is greater than the sensor selection threshold value (step S1: NO), then operation proceeds to step S2 in order to judge whether or not the leaked fluid has occurred, based on the detection result of the concentration sensor 24.

In step S2, it is detected whether or not a concentration detection value due to the concentration sensor 24 is greater than a certain value. The certain value herein is a concentration of the hydrogen gas inside the storage section 22 representing a judgment standard of whether or not the leaked fluid has occurred, and is preset according to specifications of the high pressure tank apparatus 10, and so on. If it is detected in step S2 that the concentration detection value is less than or equal to the certain value (step S2: NO), then the leaked fluid is judged not to have occurred, whereby operation returns to step S1. If it is detected in step S2 that the concentration detection value is greater than the certain value (step S2: YES), then operation proceeds to later-mentioned step S5.

In the judging step, if it is detected in step S1 that the internal pressure detection value is less than or equal to the sensor selection threshold value (step S1: YES), then operation proceeds to step S3 whereby the concentration sensor 24 is set to OFF, after which operation proceeds to step S4 in order to judge whether or not the leaked fluid has occurred, based on the detection result of the pressure sensor 26.

In step S4, it is detected whether or not a decrease amount per unit time of the internal pressure detection value is greater than or equal to a judgment threshold value. The judgment threshold value is a decrease amount per unit time of the internal pressure of the high pressure tank 16 representing a judgment standard of whether or not the leaked fluid has occurred.

Figure 5:
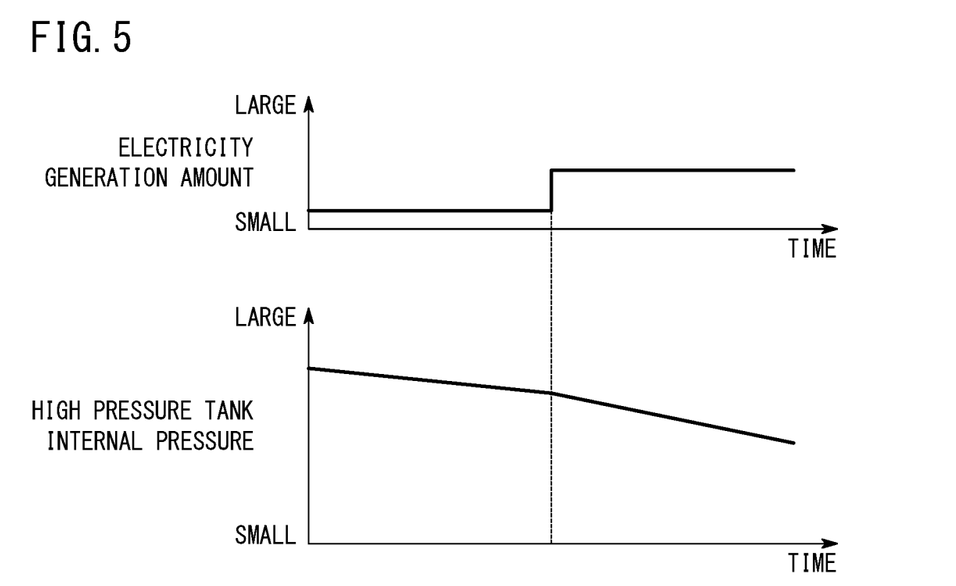
FIG. 5 shows a graph explaining a relationship between an elapsed time during hydrogen gas supplied to a fuel cell system and an electricity generation amount due to the fuel cell system, and a graph explaining a relationship between the elapsed time and an internal pressure of a high pressure tank.

For example, as shown in FIG. 5, in the fuel cell system 14, a consumption speed of the hydrogen gas changes according to an electricity generation amount of the fuel cell system 14, so the decrease amount per unit time of the internal pressure of the high pressure tank 16 also changes according to the electricity generation amount of the fuel cell system 14. In other words, when the electricity generation amount of the fuel cell system 14 is small, the decrease amount per unit time of the internal pressure of the high pressure tank 16 also becomes small. Moreover, when the electricity generation amount of the fuel cell system 14 is large, the decrease amount per unit time of the internal pressure of the high pressure tank 16 also becomes large. Therefore, the judgment threshold value is set changeably according to the electricity generation amount of the fuel cell system 14.

Setting the judgment threshold value in the above-described way results in that when the decrease amount per unit time of the internal pressure detection value obtained by the pressure sensor 26 is less than or equal to the judgment threshold value, the high pressure tank apparatus 10 may be judged to be in a range of normal operation. Hence, if it is detected in step S4 that the decrease amount per unit time of the internal pressure detection value is less than the judgment threshold value (step S4: NO), then the leaked fluid is judged not to have occurred, whereby step S4 is repeatedly executed.

If it is detected in step S4 that the decrease amount per unit time of the internal pressure detection value of the high pressure tank 16 is greater than or equal to the judgment threshold value (step S4: YES), then operation proceeds to step S5. In step S5, the leaked fluid during an abnormality is judged to have occurred in the high pressure tank apparatus 10. In this case, processing of leakage judgment ends, and a countermeasure such as closing the above-described main stop valve to stop supplying/discharging of the hydrogen gas, or stopping the mounting body, is taken.

As described above, when the internal pressure detection value is less than or equal to the sensor selection threshold value, the temporary release fluid is sometimes stored in the storage section 22, hence it is detected whether or not the leaked fluid has occurred, based on the detection result of the pressure sensor 26 that detects the internal pressure of the high pressure tank 16, instead of the concentration sensor 24 that detects the concentration of the fluid inside the storage section 22. As a result, it can be avoided being mistakenly judged during normal operation that leakage during an abnormality has occurred.

On the other hand, when the internal pressure detection value becomes greater than the sensor selection threshold value, it becomes easier for a leakage speed or leakage amount of the leaked fluid to increase, proportionally to the increase of a pressure difference of the inside and outside of the liner 52, hence it is required to be judged with high accuracy that the leaked fluid has occurred. Accordingly, in order to obtain a judgment result with higher accuracy than by the pressure sensor 26, it is judged whether or not the leaked fluid has occurred, based on the detection result of the concentration sensor 24. At this time, the temporary release fluid is not stored in the storage section 22, so the concentration of the leaked fluid can be obtained as the concentration detection value by the concentration sensor 24. Therefore, by comparing the concentration detection value and the certain value, it can be avoided being mistakenly judged during normal operation that leakage during an abnormality has occurred, and it can be judged with high accuracy that the leaked fluid has occurred.

As described above, in the high pressure tank apparatus 10, the lead-out hole 84 is formed in the supplying/discharging-side cap 56, hence it becomes possible for the temporary release fluid to be favorably led to the storage section 22 by the lead-out hole 84, and for accumulation of the fluid in the covered section 85 to be effectively suppressed. It can therefore be effectively avoided that the temporary release fluid is discharged to a place other than the storage section 22. Moreover, it can be more effectively avoided there occurring the likes of separation of the liner 52 and the reinforced layer 50, or buckling where the liner 52 projects toward its inside, and there can thus be achieved further improvement in durability of the high pressure tank 16.

The present invention is not particularly limited to the above-described embodiments, and may be variously modified in a range not departing from the spirit of the present invention.

For example, in the high pressure tank apparatus 10, the lead-out hole 84 may be formed also in the end-side cap 60, and there may be further included a configuration such as a pipe enabling the temporary release fluid that has been led out from the lead-out hole 84 to be stored in the storage section 22. Moreover, the high pressure tank 16 need not include the end-side cap 60. Furthermore, the supporting plate 94 for attaching the cover member 20 to the high pressure tank 16 may be sandwiched also between the tip surface 70a of the projection 70 and the head section 90 of the inserting member 59, of the end-side cap 60.

Although in the above-described high pressure tank apparatus 10, a configuration was adopted enabling the temporary release fluid to be stored in the storage section 22 via the inside of the cover member 20, the present invention is not particularly limited to this. The storage section 22 may be configured by a wall section surrounding the entire high pressure tank 16 and the supplying/discharging flow path 12, or may be configured without surrounding the supplying/discharging flow path 12.

Although the above-described high pressure tank apparatus 10 adopted a configuration of including one high pressure tank 16, a plurality of the high pressure tanks 16 may be included. In this case, the temporary release fluid or leaked fluid of the plurality of high pressure tanks 16 may be stored by one storage section 22, or there may be provided a plurality of the storage sections 22 of the same number as there are high pressure tanks 16, and the temporary release fluid or leaked fluid may be stored in the storage section 22 for each of the high pressure tanks 16.

The supplying/discharging flow path 12 is not limited to being configured from the likes of the above-described pipes 40, 42, 44, or branch path 36, and there may be adopted a variety of configurations enabling the hydrogen gas (the fluid) to be supplied/discharged to/from the high pressure tank 16.

What is claimed is:

1. A method of leakage judgment of a high pressure tank apparatus that comprises a high pressure tank and in which a fluid is supplied/discharged to/from a resin-made liner of the high pressure tank via a supplying/discharging flow path,
the high pressure tank comprising: a reinforced layer covering an outer surface of the liner; and a supplying/discharging hole that communicates the supplying/discharging flow path and an inside of the liner, and
the high pressure tank apparatus comprising: a storage section capable of storing a leaked fluid and a temporary release fluid, the leaked fluid being the fluid that has leaked from at least a connecting section of the supplying/discharging flow path and the supplying/discharging hole, and the temporary release fluid being the fluid that has been led out to outside of the high pressure tank from between the liner and the reinforced layer; a concentration sensor that detects a concentration of the fluid inside the storage section; a pressure sensor that detects an internal pressure of the high pressure tank; and a control section that judges whether or not the leaked fluid has occurred,
the method of leakage judgment including:
a comparing step where an internal pressure detection value due to the pressure sensor and a sensor selection threshold value are compared; and
a judging step where in the case where the internal pressure detection value is greater than the sensor selection threshold value, it is judged whether or not the leaked fluid has occurred, based on a detection result of the concentration sensor, and in the case where the internal pressure detection value is less than or equal to the sensor selection threshold value, it is judged whether or not the leaked fluid has occurred, based on a detection result of the pressure sensor.

2. The method of leakage judgment of the high pressure tank apparatus according to claim 1, wherein
in the case where the internal pressure detection value is greater than the sensor selection threshold value, it is judged in the judging step that the leaked fluid has occurred when a concentration detection value due to the concentration sensor is greater than a certain value.

3. The method of leakage judgment of the high pressure tank apparatus according to claim 1, wherein
in the case where the internal pressure detection value is less than or equal to the sensor selection threshold value, it is judged in the judging step that the leaked fluid has occurred when a decrease amount per unit time of the internal pressure detection value due to the pressure sensor is greater than or equal to a judgment threshold value.

4. A high pressure tank apparatus that comprises a high pressure tank and in which a fluid is supplied/discharged to/from a resin-made liner of the high pressure tank via a supplying/discharging flow path,
the high pressure tank including: a reinforced layer covering an outer surface of the liner; and a supplying/discharging hole that communicates the supplying/discharging flow path and an inside of the liner, the high pressure tank apparatus comprising:
a storage section capable of storing a leaked fluid and a temporary release fluid, the leaked fluid being the fluid that has leaked from at least a connecting section of the supplying/discharging flow path and the supplying/discharging hole, and the temporary release fluid being the fluid that has been led out to outside of the high pressure tank from between the liner and the reinforced layer;
a concentration sensor that detects a concentration of the fluid inside the storage section;
a pressure sensor that detects an internal pressure of the high pressure tank; and
a control section that judges whether or not the leaked fluid has occurred,
the control section, in the case where an internal pressure detection value of the high pressure tank obtained by the pressure sensor is greater than a sensor selection threshold value, judging whether or not the leaked fluid has occurred, based on a detection result of the concentration sensor, and
in the case where the internal pressure detection value is less than or equal to the sensor selection threshold value, judging whether or not the leaked fluid has occurred, based on a detection result of the pressure sensor.

5. The high pressure tank apparatus according to claim 4, wherein
in the case where the internal pressure detection value is greater than the sensor selection threshold value, the control section judges that the leaked fluid has occurred when a concentration detection value inside the storage section obtained by the concentration sensor is greater than a certain value.

6. The high pressure tank apparatus according to claim 4, wherein
in the case where the internal pressure detection value is less than or equal to the sensor selection threshold value, the control section judges that the leaked fluid has occurred when a decrease amount per unit time of the internal pressure detection value is greater than or equal to a judgment threshold value.

7. The high pressure tank apparatus according to claim 4, wherein
the high pressure tank includes a cap provided in an opening of the reinforced layer, and
the cap has formed therein a lead-out hole by which the fluid interposing between the liner and the reinforced layer is led out to inside the storage section.

* * * * *